Patented Aug. 9, 1932

1,870,372

UNITED STATES PATENT OFFICE

ERNEST J. MAUST, OF NEW YORK, N. Y., ASSIGNOR, BY MESNE ASSIGNMENTS, TO THE DORR COMPANY, INC., OF NEW YORK, N. Y., A CORPORATION OF DELAWARE

SLURRY FILTRATION

No Drawing. Application filed September 22, 1930. Serial No. 483,767.

This invention relates to the filtration of cement slurry. Its object is to provide a dosing agent, or filter aid, to increase the filtering rate but which will have no injurious effect upon the cement. A further object is to provide a filter aid for cement slurry which will not be of a nature to cause the cement to "set", and one which will be as cheap as cement whereby the cost of the final product will not be increased.

The invention therefore resides in the selection of a filter aid easily obtainable by a cement plant which will increase the flocculation of the cement slurry, and more specifically in the use of lime, in relatively small amounts.

Lime has been selected as my preferred dosing agent for the reason that when it is added to cement slurry, it changes the iso-electric value of the slurry and this different iso-electric point floc formation takes place to a greater extent. An increase in flocculation means an increase in viscosity for a given percentage of water and an added ease of filtration. Flocs tend to bridge over the pores of the filter cloth keeping the openings clear for the passage of water and air. The pH value of the slurry is changed slightly and the solution of CaOH makes it slightly more alkaline. Possibly other changes take place which I do not now know of for the amount of lime I use (about 0.1%) is so small that the results are entirely unexpected for the slurry already has in it plenty of lime.

Lime is especially desirable for this work in that it has very low cost and can be produced cheaply and easily by the cement plant itself. Also it shows up as one of the compounds in the cement. It has no injurious effects. As cement sells for about the same price as the lime, the cost of the addition is slight, in fact so far as is known now, it appears to be the cheapest dosing agent which can be successfully used in filtering cement slurry.

In carrying out my invention, I have mixed hydrated lime with two parts of water by weight and mixed it with the kiln feed slurry either in the thickener or in the filter feed. The increase in water content of the slurry with this addition was less than one-tenth of one percent. However, I find no such benefits if the lime be added to the classifier overflow before thickening.

I find that the viscosity of slurry at 42% moisture with 0.1% lime addition is relatively the same with 42% moisture in the filter feed as with 39% moisture filter feed similarly dosed.

I also find that by raising the temperature of the filter feed with 0.1% lime addition, from 80° F. to 120° F., there is a still further 25% increase in filter capacity.

Again I find there is less dissolved calcium salts in the filter effluent with 0.1% lime addition than without, in fact only about half as much.

I therefore propose to use less than one percent of lime as a filter aid in cement slurry filtration, by adding either as hydrated lime or quick-lime to the slurry prior to filtration at any point in the raw material circuit beginning with the coarse crushing. Naturally, the usual mixing and periods of contact of lime with the slurry will be used. Also as stated above I may use heat. Likewise I mean to use the invention with all practical ranges of cement slurry moisture. And the invention also may be applied to marl slurry filtration.

The advantages of the use of a very low percentage of lime in cement slurry feed may be said to be:

1. Increase in filter capacity from 20–40%.
2. Obtaining adequate capacity from existing filter area with a higher percentage of water in the filter feed.
3. Permits the filter to be speeded up giving in effect instantaneous filtration.
4. A better cake discharge because of ability to build up a thicker cake.
5. Less blinding of filter cloth due to floc formation which tends to act as a filter medium rather than the cloth.
6. A filtrate containing less soluble lime salts.
7. Longer life of filter cloth due to neutralization of the soluble $SO_3$.
8. No cost for dosing agent as all of the lime enters the clinker and the clinker sells for approximately as much as the cost of the lime added.

A practical demonstration of this invention showed that a 0.06% to 0.1% hydrated lime addition to the filter feed at approximately 41% moisture caused plant clinker production to increase from an average of 4480 bbls. per day to 5230 bbls. which is an over-all increase of 17%. However, this increase was limited by kiln capacity and not by filter capacity increase which was larger than this.

Herein I have specified lime as a dosing agent although I may use other equivalents having the same general properties and while I have mentioned 0.1%, it is to be understood that this appears to be an optimum amount and not a precisely limiting one although I may place a lower limit on the amount used at .01%.

Claim:

In cement slurry filtration, the step of adding 0.1% of lime.

In testimony whereof I affix my signature.

ERNEST J. MAUST.